United States Patent
Goseling et al.

(10) Patent No.: US 6,938,435 B2
(45) Date of Patent: Sep. 6, 2005

(54) METHOD FOR COOLING MEALS AND STIRRING DEVICE EMBODIED AS HEAT EXCHANGER

(75) Inventors: Hubert Goseling, Assamstadt (DE); Paul Kienzle, Weikersheim (DE)

(73) Assignee: Metos Oy Ab, Kerava (FI)

( * ) Notice: Subject to any disclaimer, the term of this patent is extended or adjusted under 35 U.S.C. 154(b) by 6 days.

(21) Appl. No.: 10/467,772

(22) PCT Filed: Feb. 4, 2002

(86) PCT No.: PCT/DE02/00395

§ 371 (c)(1), (2), (4) Date: Aug. 7, 2003

(87) PCT Pub. No.: WO02/062158

PCT Pub. Date: Aug. 15, 2002

(65) Prior Publication Data

US 2004/0079091 A1 Apr. 29, 2004

(30) Foreign Application Priority Data

Feb. 8, 2001 (DE) .......................... 101 06 087

(51) Int. Cl.⁷ .......................... A23G 9/00; F25D 25/02; F28F 17/00; B01F 15/06
(52) U.S. Cl. .............................. 62/342; 62/381; 165/92; 366/147
(58) Field of Search .............................. 62/62, 68, 342, 62/354, 381; 165/92; 366/147

(56) References Cited

U.S. PATENT DOCUMENTS

| | | | | |
|---|---|---|---|---|
| 201,704 A | * | 3/1878 | Sahlfeld .................... | 165/92 |
| 447,566 A | * | 3/1891 | Hobbs ...................... | 165/92 |
| 1,748,320 A | * | 2/1930 | Wallis et al. .............. | 165/92 |
| 1,838,610 A | * | 12/1931 | Bodes ...................... | 165/74 |
| 2,217,379 A | * | 10/1940 | Gordon ..................... | 165/74 |
| 2,254,389 A | * | 9/1941 | Olcott ...................... | 127/17 |
| 3,168,431 A | * | 2/1965 | Spielvogel ................. | 159/37 |
| 3,739,710 A | * | 6/1973 | Costa et al. ............... | 99/348 |
| 3,903,957 A | * | 9/1975 | Bremer .................... | 165/92 |
| 4,478,247 A | | 10/1984 | Alber | |
| 4,640,099 A | | 2/1987 | Gibot | |
| 5,218,898 A | | 6/1993 | Norris | |
| 5,381,670 A | | 1/1995 | Tippmann et al. | |
| 5,864,963 A | | 2/1999 | Komulainen | |

FOREIGN PATENT DOCUMENTS

| | | |
|---|---|---|
| DE | 12 62 974 B | 3/1968 |
| DE | 1 926 704 | 11/1970 |
| DE | 32 00 165 A1 | 7/1983 |
| DE | 32 18 637 A1 | 11/1983 |
| DE | 37 27 594 A1 | 3/1989 |
| DE | 40 09 157 C2 | 9/1991 |
| DE | 91 10 133 U1 | 11/1991 |
| DE | 0 907 060 A | 4/1999 |
| EP | 0 338 282 B1 | 10/1989 |
| JP | 57-056 033 | 4/1982 |

* cited by examiner

Primary Examiner—William C. Doerrler
(74) Attorney, Agent, or Firm—McGlew and Tuttle, P.C.

(57) ABSTRACT

The invention relates to a method of producing a plurality of portions of a precooked food wherein the food is initially cooked at temperatures above 80° C. and prepared, the food is then cooled in a cooling phase within a maximum time of 120 min passing through the temperature range of 55° C. to 8° C. to a final temperature in the range of 8° C. to 0° C., and stored for a few days at the final temperature. The food is poured into an agitator vessel (22) during the cooling phase wherein the food is simultaneously thoroughly mixed and cooled during the cooling phase by an agitator (01, 26) constructed as a heat exchanger according to the invention.

29 Claims, 9 Drawing Sheets

METHOD FOR COOLING MEALS AND STIRRING DEVICE EMBODIED AS HEAT EXCHANGER

FIELD OF THE INVENTION

The invention pertains to a method for producing a plurality of portions of a precooked food wherein the food is initially cooked at temperatures above 55° C. and prepared ready for consumption, with the food then being cooled in a cooling phase from the preparation tempurature to a final temperature.

The invention further pertains to an agitator for arrangement in an agitator vessel wherein intermixable mass contained in the agitator vessel can be thoroughly mixed by driving the agitator, and wherein the agitator is constructed in the fashion of a heat exchanger and a cooling and/or heating medium can flow through the agitator at least in sections, and wherein the agitator has an agitator head, at least one agitating vane and cross-pieces connecting the agitator head and the agitating vanes.

BACKGROUND OF THE INVENTION

In many community care institutions, for example canteens of large companies or in hospitals, there is a need for food to be distributed seven days a week. If this food is freshly prepared each time seven days a week, high costs are incurred because kitchen staff can only be employed over the weekend if corresponding extra charges are paid. Thus, a method described in the specialist circles as "cook and chill" is used in many cases. In this method the food is only prepared on weekdays with the portions required for the weekend being precooked at this time. After the precooked quantity of food has been prepared, this is chilled to a temperature below 8° C. and stored at a suitable cool temperature. In this case, the temperature should briefly fall below 3° C. at least once. The food mass can then be heated for consumption at the weekend in its entirety or in portions.

A problem with the "cook and chill" method is that hygiene problems can occur as a result of the storage of the food before its heating. In this case, it is not so much the storage at a temperature below 8° C. that is critical since micro-organisms such as bacteria and fungi barely multiply at these temperatures. Rather it is the cooling phase which is to be regarded as the critical stage during which the food passes through a temperature range from 55° C. to the final temperature below 8° C. In this temperature band micro-organisms in the pre-cooked food find optimum conditions for multiplication and thus multiply especially vigorously during the cooling phase.

In order to keep the multiplication of micro-organisms below a tolerable level during the cooling phase, it is necessary for the precooked food to be cooled to the final temperature within the shortest possible time. In order to reliably reduce the multiplication of micro-organisms during the cooling phase, it is essential that not only parts of the food have reached the final temperature within a sufficiently short time but that the food mass from the edge as far as the core has been continuously cooled to the final temperature.

If the food is cooled merely starting from the edge, for example, by placing a container containing the food mass in a refrigerator, the time before the core of the food mass has reached the end temperature depends on the volume of the food mass relative to its edge surface at which cooling can take place. In order to keep the cooling phase during passage through the critical temperature range until the final temperature is reached in the core of the food mass to a tolerable level in the range of less than 120 minutes, especially shorter than 90 minutes, it is thus known that flat containers can be filled with the pre-portioned food and these flat containers can then be cooled individually. However, this pre portioning in smaller containers again incurs higher costs.

DE 40 09 157 C2 describes a method for pre-treating rice wherein the rice is precooked in accordance with a specific temperature process and then dried.

EP 0 338 282 BI discloses a method for sterile precooking of noodle products which can then be packaged ready for consumption after cooking.

DE 37 27 594 A1, DE-OS 1 926 704 and DE 32 00 1.65 A1 each describe agitators wherein the agitator is constructed in the fashion of a heat exchanger and can have a cooling or heating medium flowing through it.

SUMMARY OF THE INVENTION

The object of the present invention is to propose a new method for cooling a plurality of portions of a precooked food without the need to pre-portion this before the cooling process.

It is a further object of the invention to propose an agitator that is especially suitable for implementing the method according to the invention.

An advantage of the method according to the invention is especially that during the cooling phase the food is cooled and at the sane time thoroughly mixed by using an agitator. As a result of the thorough mixing of the food mass which later yields a plurality of individual food portions, rapid temperature equalization can be achieved between the various temperature regions in the agitator vessel. In addition, by using an agitator constructed as a heat exchanger through which flows a gaseous or a liquid coolant, the cooling surface in contact with the food is enlarged considerably. As a result, the cooling phase for passing through the critical temperature range between 55° C. and 8° C. can be shortened considerably by these measures.

It is fundamentally possible to cool the food merely by using the agitator constructed as a heat exchanger. However, the cooling power can be increased considerably if the agitator vessel is also cooled during the cooling phase. Conventional agitator vessels constructed as doublewalled and through which flows a coolant such as iced water, ice slush or a glycolwater mixture can be used for this purpose.

In order to carry out the method according to the invention, a new type of agitator is required which is suitable for thoroughly mixing the food in conjunction with the agitator vessel. The agitator is generally constructed in the fashion of a heat exchanger and can have a cooling medium flowing through it so that thermal energy can be removed from the food mass as a result. In order to be able to achieve an adequate flow cross-section in the agitator head, as is especially required when using ice slush as coolant, the agitator head in the agitator according to the invention is formed of a fixedly arranged lid and tank which is rotatable with the agitator, wherein the lid can be attached to the tank in a sealing fashion.

The use of the agitator according to the invention is not limited to the usage for cooling pre-cooked food. If a heating medium, for example, hot water or hot steam, flows through the agitator instead of a cooling medium, it is naturally also possible to heat the food mass mixed thoroughly by the agitator. As a result, the duration of the heating phase during the preparation of the food can be shortened appreciably since larger quantities of heat can be coupled into the food mass in a shorter time.

The agitator according to the invention is also not limited to the area of usage for food preparation but can be used in all cases where intermixable masses must be heated or cooled as uniformly as possible. Intermixable masses in the sense of this invention are all substances or substance mixtures whose state of aggregation at least allows slight intermixing. These especially include highly viscous masses such as mashed potato for example, or mixtures of liquid constituents and solid constituents such as a stew, for example.

For example, it is feasible to use the agitator according to the invention in the chemical industry in order to thoroughly mix various reagents and at the same time to cool or heat them. The dimensioning of the agitator according to the invention depends on the particular usage. Dimensions having diameters in the centimeter range for laboratory equipment as far as diameters of a few meters in the chemical industry are feasible. When the agitator according to the invention is used for the preparation of food, its dimensions are substantially determined by the dimensions or the maximum capacity of the vessels in which the food is accommodated. Depending on the cooling or heating power required, the cooling or heating surface presented by the agitator can be adapted in a simple manner for example by increasing the number of agitating vanes. The outer dimensions of the agitator can remain unchanged in this case.

All gaseous or liquid media, for example, iced water, a glycol-water mixture, liquid nitrogen, hot water or hot steam can be used as cooling and/or heating medium since the cooling or heating medium merely removes thermal energy from the mass to be thoroughly mixed or couples it therein, but there is no direct exchange of material. In the food area iced water, hot water and hot steam are especially suited for use in the agitator according to the invention, since these media are already present in many cases in large kitchens and in addition, in the event of faults, that is if the medium unintentionally escapes from the agitator, for example, as a result of leakages, there is no health hazard.

The design of the agitator is fundamentally arbitrary as long as at the outer surfaces of the agitator which come into contact with the mass to be intermixed, it is made possible for sufficient heat exchange between the mass to be intermixed and the cooling or heating medium flowing through the agitator. It is especially advantageous if the agitator has an agitator head and one or a plurality of agitating vanes wherein the agitator head and the various agitating vanes are interconnected by means of cross-pieces. The agitator vanes and cross-pieces should be constructed as double-walled and thereby form individual pipe sections. By means of a suitably sealing join between the agitating vanes, the cross-pieces and the agitator head, for example, by welding the individual parts, a closed pipe is formed whose inlet and return open into the agitator head. An inlet and an outlet for the cooling or heating medium are provided on the agitator head itself. As a result, the cooling or heating medium flows into the agitator head and from there flows through the individual agitating vanes and the cross-pieces connecting the agitating vanes. The medium cooled or heated as a result of the heat exchange in the cross-pieces or agitating vanes then flows out via the agitator head and is removed via the outlet. In this case, it is especially advantageous if the cooling or heating medium is guided in a cooling or heating circuit by a cooler or a heating device. Naturally, it is also possible for a plurality of pipes running parallel to one another to run from the agitator head through the individual agitating vanes and crosspieces such that cooling or heating medium can flow through the agitator along a plurality of pipes running parallel one to the other.

In order to prevent intermixing of the cooling or heating medium at the inlet or return in the agitator head, the agitator head can have two separate chambers. The first chamber forms the inlet of the pipe through the agitator and can be connected to the inlet for the cooling or heating medium. The second chamber then forms the return of the pipe through the agitator and can be connected to the outlet for the cooling or heating medium. Intermixing of the fresh cooling or heating medium at the inlet with the already heated or cooled cooling or heating medium at the return is eliminated by the dividing wall between the two chambers.

In order to construct the connections for the inlet and outlet of the cooling or heating medium simply, for example, in the fashion of plug couplings to which suitable hoses can be connected, it is advantageous if the agitator head has one fixed part and one part which can be rotated together with the agitating vanes. The connections for the inlet or outlet of the cooling or heating medium are then arranged in the fixed part whereas the rotatably mounted part of the agitator head forms the inlet or outlet into the pipe through the agitator.

In order that the agitating vane according to the invention can be used in different agitating vessels, it is advantageous if different adapter elements can be affixed to the agitator head as desired, and can each be brought into engagement with different drive shafts. As a result, it can thereby be achieved that the agitator with the agitator head, the agitating vanes and the cross-pieces can be produced in standard product series and can be adapted to different drive shafts by attaching different adapter elements.

Alternatively to driving the agitator by means of a drive motor and a drive shaft which transmits the rotational motion, the flow energy of the cooling or heating medium flowing in at the inlet can also be used to drive the agitator. For example, known flow lamellae can be arranged for this purpose in the agitator head, which convert the flow energy of the inflowing medium into a rotational movement.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
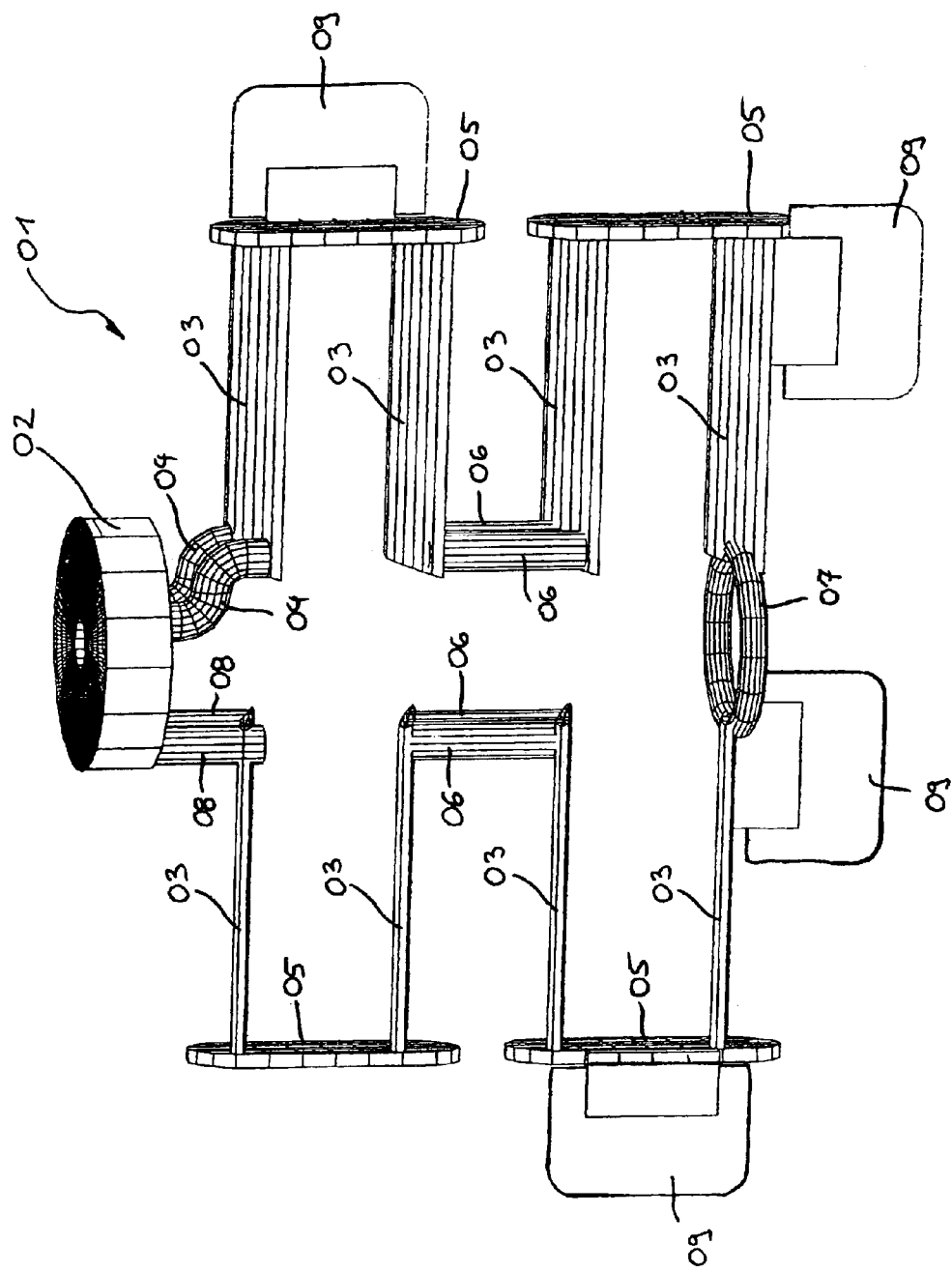
FIG. 1 shows a side view of an agitator.

Referring to the drawings in particular, FIG. 1 shows an agitator 01 which can be used in a vessel for preparing food and is used to thoroughly mix and heat or cool the food.

The agitator 01 is manufactured as a welded part and is substantially constructed of an agitator head 02, eight agitating vanes 03 and crosspieces 04, 05, 06, 07 and 08 which connect the agitating vanes 03 or the agitator head 02. The agitating vanes 03 and the cross-pieces 04 to 08 are constructed as double-walled and are connected to form a closed pipe so that a cooling or heating medium flowing in at the agitator head 02 flows through the agitator 01 along this pipe and can remove thermal energy or couple in thermal energy.

The agitating vanes 03 are inclined at an angle of around 20° with respect to their horizontal plane of movement so that when the agitator 01 is rotationally driven about its central axis the mass flowing past the agitating vanes 03 is deflected upwards or downwards so that the mass is continuously intermixed and no stationary zones are formed.

The agitator 01 is driven using a drive shaft, not shown, which is provided in the agitator vessel and which extends from the base of the agitator vessel upwards and can be brought into engagement in a receptacle on the agitator head 02. So that the drive shaft does not collide with the agitator 01, the cross-piece 07 is constructed in the fashion of a ring conduit so that the drive shaft can penetrate through the agitator 01 in the region of the cross-piece 07.

Attached to each of two of the cross-pieces 05 and to the two lower agitating vanes 03 are skimming elements 09 which are guided along the component wall of the agitator vessel during the rotational drive movement of the agitator 01, so that no stationary zones form in the boundary region between the mass and the component wall, but optimal intermixing is also achieved in this region. In order that the agitator can be used in agitator vessels of different dimensions, the skimming elements 09 are adjustably attached to the agitator 01 so that the sizes can be compensated.

Figure 2:
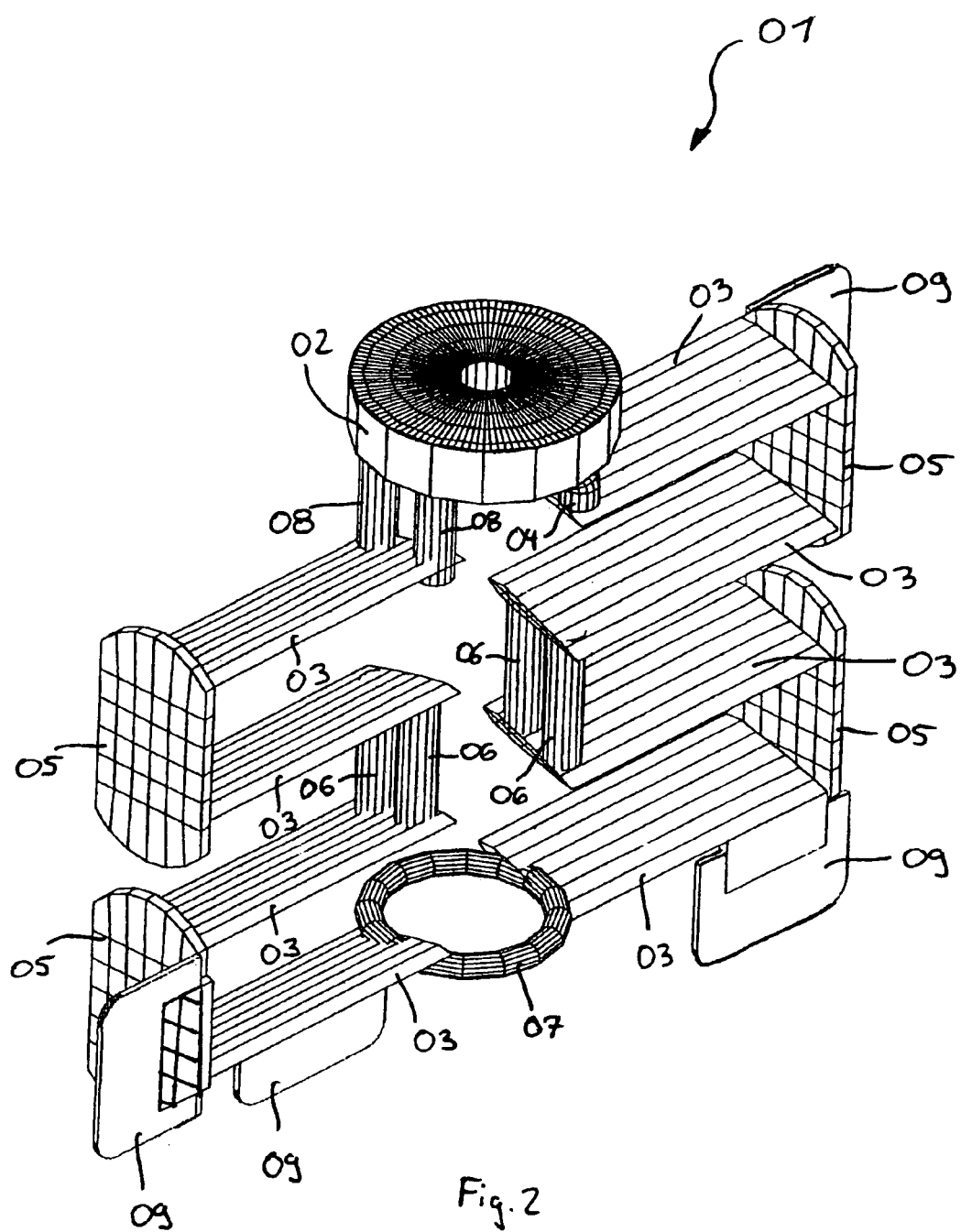
FIG. 2 shows a first perspective view of the agitator from FIG. 1.
Figure 3:
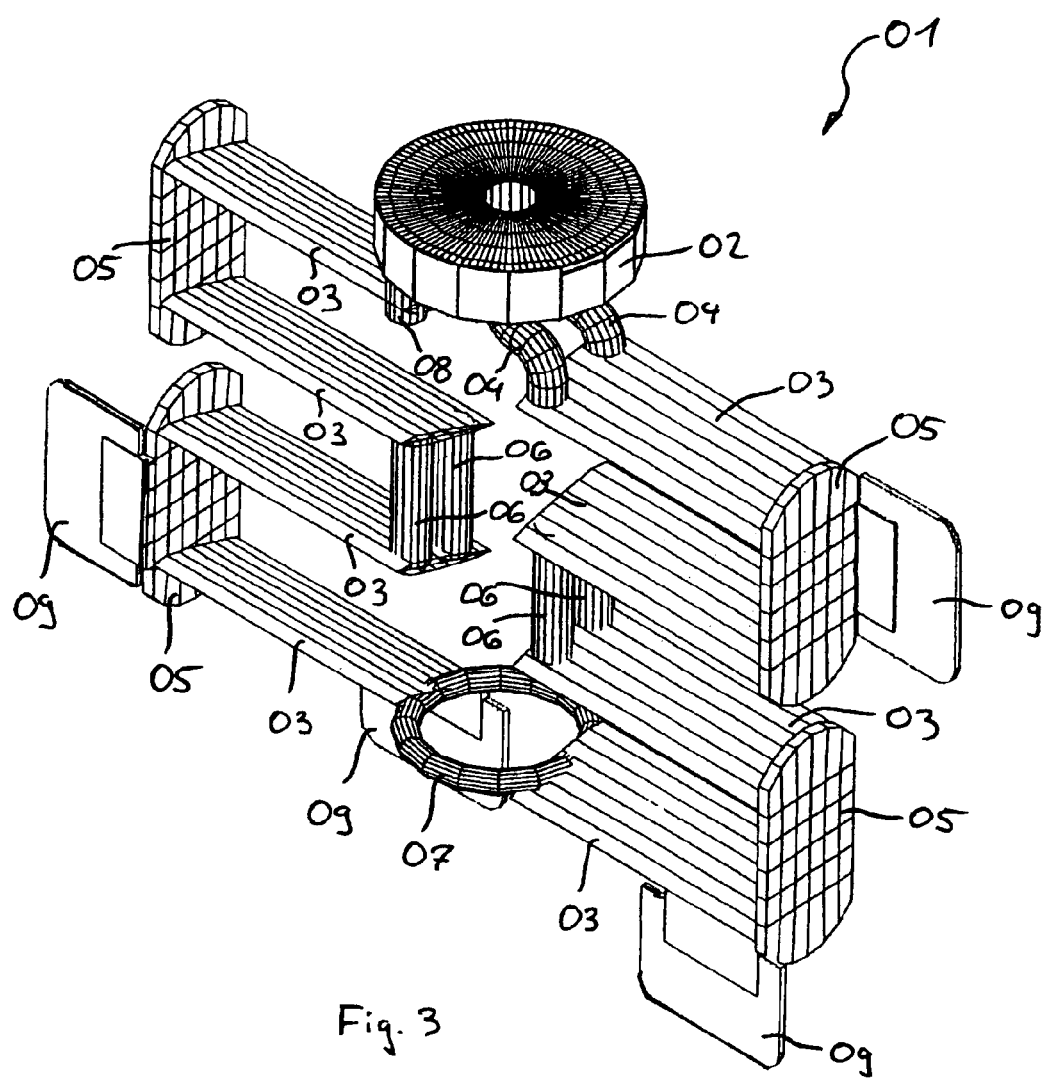
FIG. 3 shows a second perspective view of the agitator from FIG. 1.

FIGS. 2 and 3 show the agitator 01 in two different perspective views.

Figure 4:
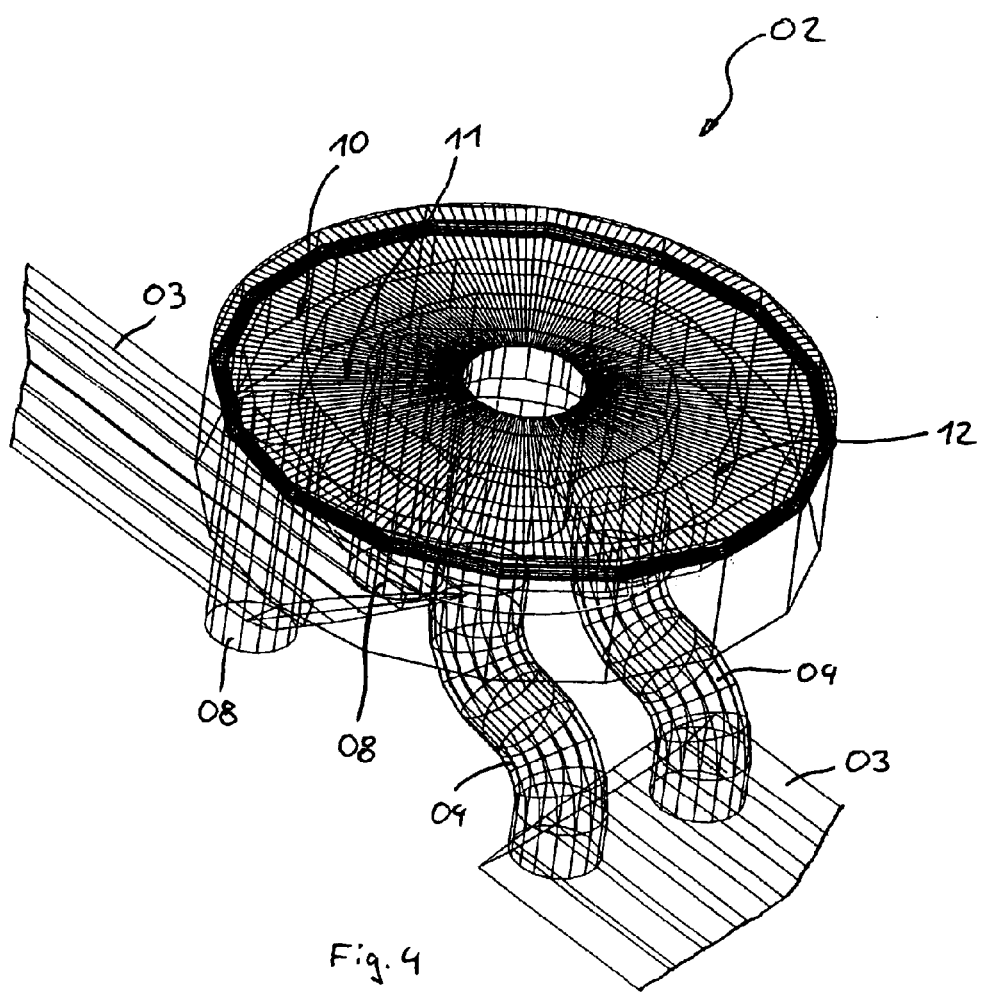
FIG. 4 shows a wire frame model of an agitator head.

In FIG. 4 the agitator head 02 is shown in enlarged view as a wire frame model. The cover of the agitator head 02 with the connections for the inlet and outlet of the cooling or heating medium is not shown in this wire frame model. The agitator head has two concentrically arranged chambers 10 and 11 which are separated from one another by a dividing wall 12. The cross-pieces 04 both open into the inner chamber 11 whereas the cross-pieces 08 open into the outer chamber 10. By this means it is achieved that the fresh cooling or heating medium can flow into the agitator 01 via the outer chamber 10 and the cross-pieces 08 and is separated by the dividing wall 12 from the already heated or cooled cooling or heating medium that flows back via the cross-pieces 04 into the chamber 11 of the agitator head 02.

Figure 5:
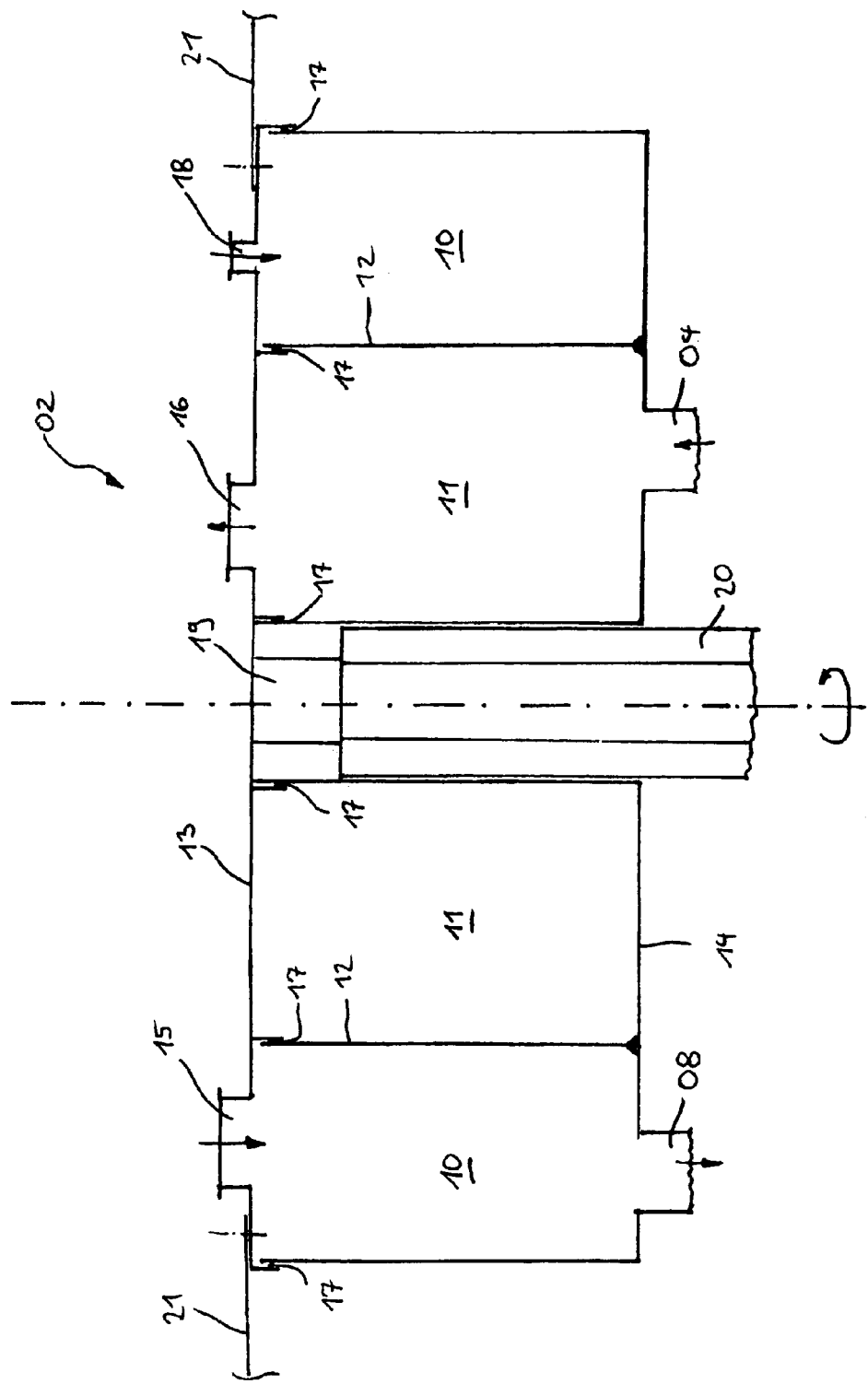
FIG. 5 shows a schematic cross-sectional view of an agitator head.

The schematic structure and the function of the agitator head 02 can be seen from the schematic cross-section shown in FIG. 5. The two chambers 10 and 11 are separated one from the other by the dividing wall 12. Both chambers 10 and 11 are bounded towards the outside by a fixedly arranged cover 13 and a tank 14 which is rotatably mounted together with the agitator. The dividing wall 12 is securely welded to the base of the tank 14 in a liquid-tight fashion.

The cooling or heating medium flows into the chamber 10 via the inlet 15 and from there into the cross-pieces 08 which form the inlet into the pipe through the agitator 01. After the cooling or heating medium has flowed through all the cross-pieces 04 to 08 and the agitating vanes 03, it flows back into the chamber 11 of the agitator head 02 via the crosspieces 04 forming the return, from where it can be removed via the outlet 16. In order to seal the chambers 10 and 11, shaft sealing rings 17 are arranged in the sealing gaps between the stationary lid 13 and the tank 14 rotating together with the agitating vanes or the dividing wall 12.

In addition to the inlet 15 and the outlet 16, also provided in the lid 13 is a compressed air connection 18 to which a compressed air pipe can be connected. Compressed air can be pressed into the chamber 10 via the compressed air connection 18 so that the heating or cooling medium in the agitator 01 can be displaced outwards via the chamber 11 and the outlet 16.

The center of the tank 14 is constructed as a polyhedral toothed structure 19 into which the end of a drive shaft 20 shaped in a complementary fashion can be brought into engagement so that a torque can be transmitted from the drive shaft 20 to the tank 14. Attached to the lid 13 is a tamper prevention element 21, shown by the broken line, to prevent any tampering with the driven agitator 01 from outside.

Figure 6:
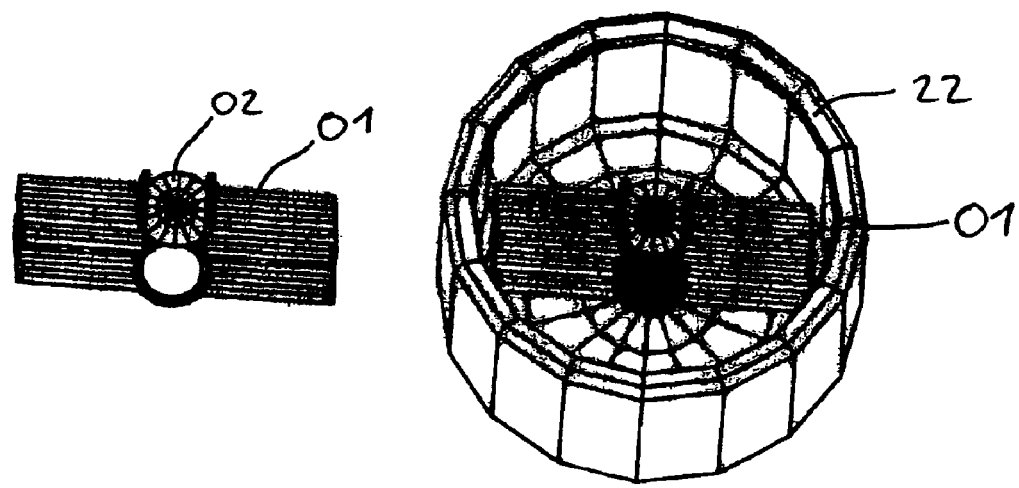
FIG. 6 shows a perspective view of an agitator vessel with agitator.

FIG. 6 shows the agitator 01 as can it can be arranged in an agitator vessel 22 constructed as a cooking vessel.

Figure 7:
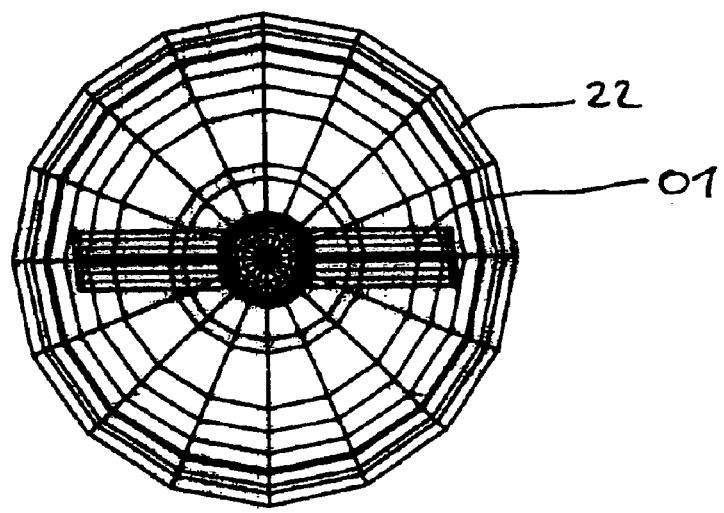
FIG. 7 shows a top view of the agitator vessel with agitator from FIG. 6.

FIG. 7 shows the agitator 01 and the agitator vessel 22 viewed from above. The agitator vessel 22 is for its part also constructed as doublewalled and can have the same cooling or heating medium flowing through it as the agitator 01 so that the food arranged in the agitator vessel 22 can be heated or cooled in a shorter time.

Figure 8:
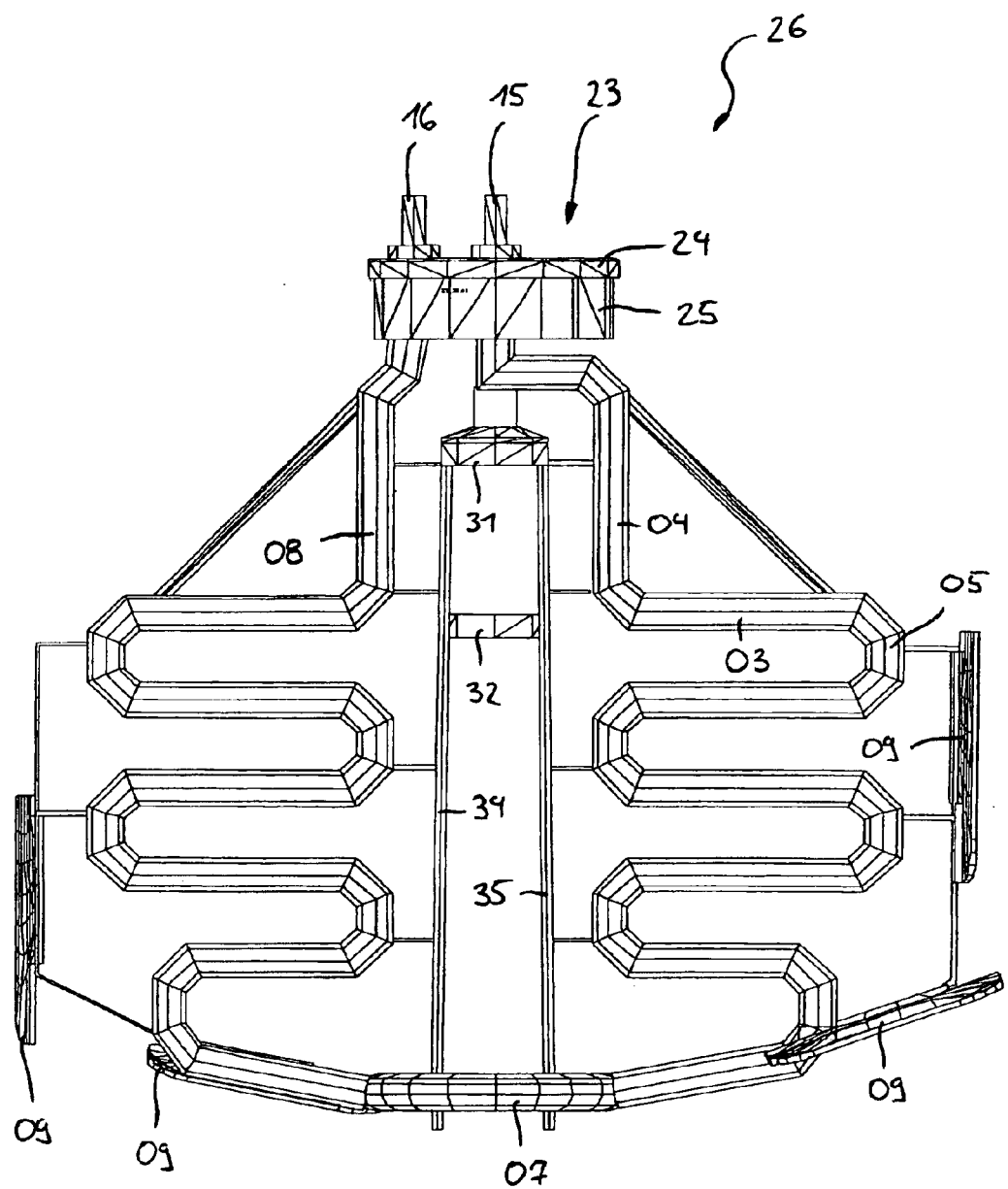
FIG. 8 shows a side view of a second embodiment of an agitator.

FIG. 8 shows a second embodiment of an agitator according to the invention viewed from the side. As in the agitator 01 there are provided double-walled cross-pieces 03, 04, 05, 06, 07 and 08 through which a suitable coolant such as ice slush can flow. The ends of the cross-pieces 04 and 08 each open into the agitator head 23 which is formed from a lid 24 and a tank 25.

In order to be able to transmit the drive power of the drive motor to the agitator 26 there is provided a receptacle which is formed of two vertical cross-pieces 34 and 35 and three inner polyhedral elements 31, 32 and 33 (see FIG. 9) affixed thereto. The drive shaft not shown in FIG. 8, which extends vertically upwards in the agitator vessel engages in a form-locking fashion in the inner polyhedral elements 31 to 33 in order to transmit the driving moment to the agitator 26. A particular advantage here is that the agitator 26 can be simply placed on the drive shaft from above especially without the need to dismantle the agitator head 23.

Figure 9:
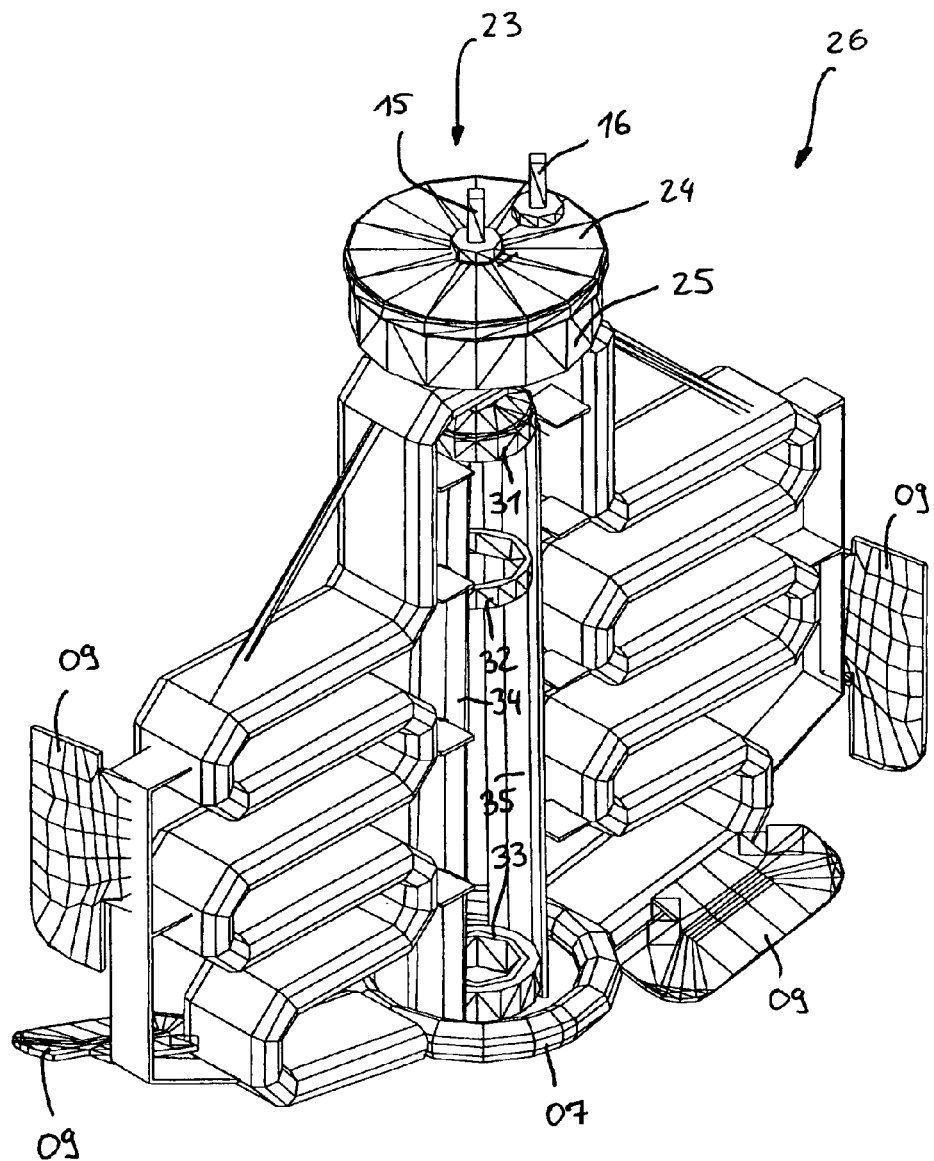
FIG. 9 shows a first perspective view of the agitator from FIG. 8.

FIG. 9 shows a perspective view of the agitator 26 wherein in particular the agitating vanes 09 can be identified.

Figure 10:
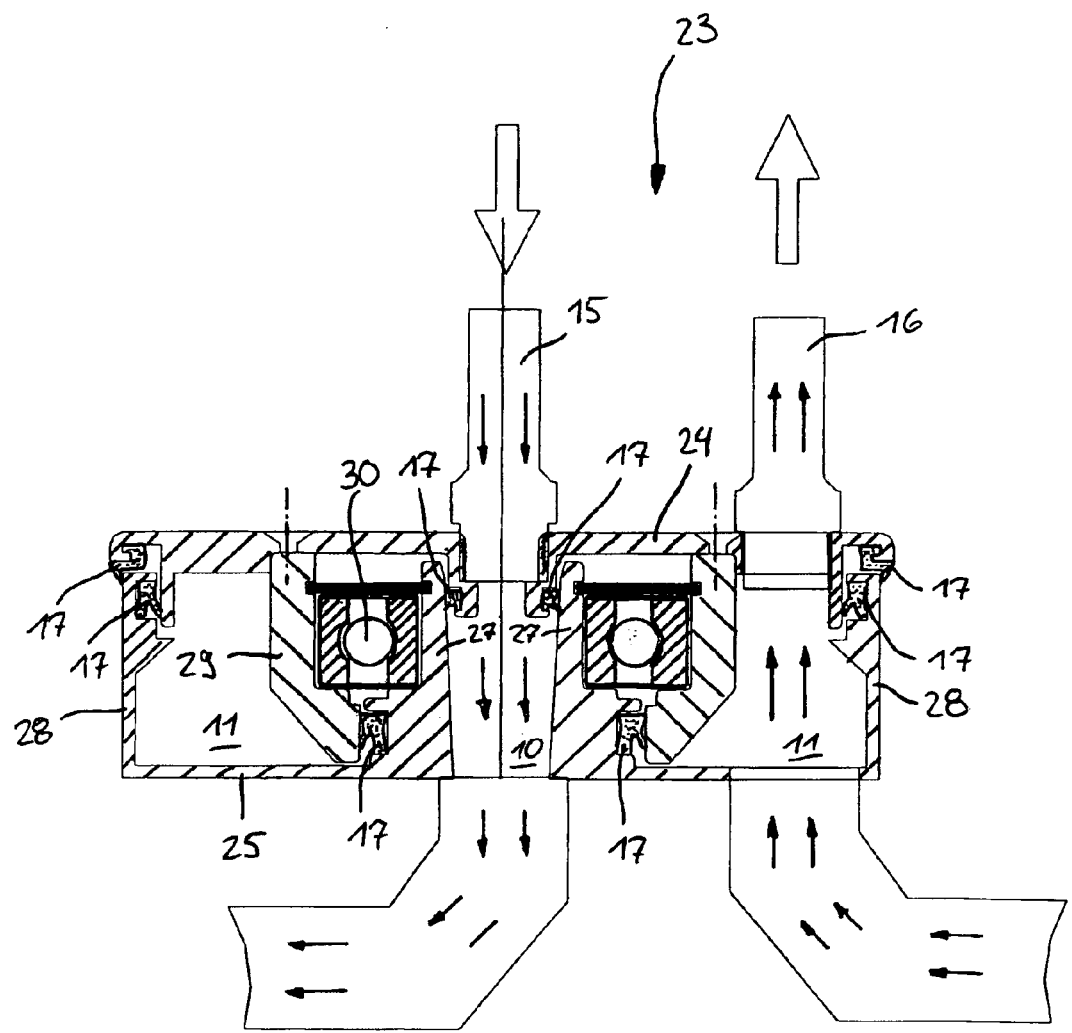
FIG. 10 shows a cross-section through the agitator head of the agitator from FIG. 8.

FIG. 10 shows a cross-sectional view of the structure of the agitator head 23. The agitator head 23 is substantially formed from a circular ring shaped tank 25 and a lid 24 rotatably mounted thereon. In order to achieve the rotatable mounting of the lid 24 on the tank 25 there is provided a securing element 29 and a bearing element 30 constructed in the fashion of a roller bearing. The securing ring 29 is rotatably mounted on the inner ring 27 of the tank 25 by means of the bearing element 30. In order to fix the lid 24 to the tank 25, fixing screws are inserted through corresponding recesses in the lid 24 and screwed into the fixing ring 29 from above, as indicated by the dot-dash line in FIG. 10. As a result, the lid 24 is thereby rotatably mounted on the tank 25 so that it is only necessary to affix the inlet 15 and the outlet 16 to assemble or dismantle the agitator 23 in an agitator vessel.

As a result of the circular ring-shaped structure of the tank 25, an inlet chamber 10 laterally bounded by the inner ring 27 is formed at the center of the tank 25. The outlet chamber 11 is bounded by the component wall of the tank 25 and the securing ring 29. The two chambers 10 and 11 are sealed in a liquid-tight fashion by the various sealing rings 17 so that during operation of the agitator 26 the coolant cannot escape from the chambers 10 and 11 through the sealing gaps. As a result of the arrangement of the chamber 10 at the center of the tank 25, a very compact agitator head can be formed whereby the compressive forces acting on the various components of the agitator head 23 do not exceed a tolerable level even at high internal pressures such as occur especially when ice slush is used as coolant.

While specific embodiments of the invention have been shown and described in detail to illustrate the application of the principles of the invention, it will be understood that the invention may be embodied otherwise without departing from such principles.

What is claimed is:

1. An agitator for arrangement in an agitator vessel wherein an intermixable mass contained in the agitator vessel can be thoroughly mixed by driving the agitator, and wherein the agitator is constructed in the fashion of a heat exchanger and a cooling and/or heating medium can flow through the agitator at least in sections, the agitator comprising:
    an agitator head;
    at least one agitating vane; and
    cross-pieces connecting the agitator head and the agitating vanes, wherein the agitator head comprises a lid arranged fixed relative to the agitator vessel and a tank rotatable together with the agitator relative to the agitator vessel, wherein the lid is connected to said tank via a seal in sealing gaps allowing relative rotation between said tank and said lid in a sealing fashion.

2. The agitator according to claim 1, wherein
a gaseous or liquid cooling and/or heating medium is used, including one of iced water, ice slush, a glycol-water mixture, and liquid nitrogen for the cooling medium and/or that hot water or hot steam can be used as the heating medium.

3. The agitator according to claim 1, wherein
in addition to the agitator head the agitator has at least one agitating vane and cross-pieces connecting the agitator head and said agitating vanes, wherein said agitating vanes and said cross-pieces are double-walled and are connected to a closed pipe whose inlet and whose return open into said agitator head and an inlet and an outlet for the cooling and/or heating medium are provided on said agitator head.

4. The agitator according to claim 3, wherein
said agitator head has two separate chambers, and the first chamber forms the inlet of the pipe through said agitator and to which said inlet for the cooling and/or heating medium can be connected and in the second chamber forms the return of the pipe through said agitator and to which said outlet for the cooling and/or heating medium is connectable.

5. The agitator according to claim 4, wherein
said chambers are formed by arrangement of a dividing wall in said tank.

6. The agitator according to claim 4, wherein
said tank is constructed as circular ring-shaped and has an inner ring and an outer ring, and the one chamber is located inside said inner ring and the second chamber is located between said inner ring and said outer ring.

7. The agitator according to claim 6, wherein
a securing ring is rotatably mounted on said tank using a roller bearing, to which said lid can be affixed such that the sealing gap between said lid and said tank is sealed.

8. The agitator according to claim 7, wherein
said bearing element is sealed in a watertight fashion towards both chambers.

9. The agitator according to claim 1, wherein
said seal in the sealing gaps between said tank and said lid comprise shaft sealing rings.

10. The agitator according to claim 3, wherein
said agitating vanes are arranged inclined relative to their movement plane.

11. The agitator according to claim 3, wherein
one of the cross-pieces is constructed in the fashion of a ring conduit which can be penetrated by a drive shaft.

12. The agitator according to claim 1, wherein
on said agitator there is arranged at least one skimming element that is guided near the lower and/or side component wall of the agitator vessel when said agitator is driven.

13. The agitator according to claim 12, wherein
said skimming element is adjustably attached to said agitator.

14. The agitator according to claim 1, wherein
a temperature sensor is arranged on said agitator and/or said agitator vessel.

15. The agitator according to claim 1, wherein
a tamper preventing element is arranged on said agitator with which the opening of said agitator can be substantially completely covered.

16. The agitator according to claim 1, wherein
said agitator can be driven by a drive motor.

17. The agitator according to claim 16, wherein
the drive motor is connected to said agitator via a drive shaft which can be brought directly or indirectly into engagement with said agitator head.

18. The agitator according to claim 16, wherein
said agitator has a receptacle extending vertically on said agitator, into which said drive shaft for rotationally fixed securing of said agitator can be inserted from above, wherein said agitator head need not be dismantled.

19. The agitator according to claim 16, wherein
different adapter elements can be affixed to said agitator as desired, to which respectively different drive shafts can be brought into engagement.

20. The agitator according to claim 1, wherein
said agitator can be driven by converting some of the flow energy of the cooling and/or heating medium flowing in at the inlet, especially that flow lamellae are arranged at said inlet, which are driven by the through-flowing cooling and/or heating medium.

21. The agitator according to claim 1, wherein
said agitator is manufactured as a welded part and/or as a glued part.

22. The agitator according to claim 1, wherein
a drain device to remove the cooling and/or heating medium from the agitating vane is provided on said agitator.

23. The agitator according to claim 22, wherein
said drain device is constructed in the fashion of a drain valve at which said cooling and/or heating medium can drain off under the action of gravity.

24. The agitator according to claim 23, wherein said drain device is constructed in the fashion of a connection for a pressurized medium, especially compressed air, wherein said cooling and/or heating medium can be displaced from said agitator by the pressurized medium.

25. The agitator according to claim 1, wherein said agitator can be arranged in an agitator vessel which can also be heated and/or cooled, especially that said agitator vessel can have the same cooling and/or heating medium flowing through as said agitator.

26. The agitator according to claim 1, wherein said agitator can be arranged in a vessel for the preparation food.

27. An agitator for arrangement in an agitator vessel, the agitator comprising:

a tank with a flow inlet region and a flow outlet region; an agitator head agitating vanes;

cross-pieces connecting the agitator head and the agitating vanes, said tank and cross pieces defining an agitator cooling and/or heating medium flow path with cooling and/or heating medium flowing through the agitator at least in sections from said tank flow inlet region, through said sections and to said flow outlet region, said tank, said agitating vanes and said cross-pieces being rotatable together relative to the agitator vessel;

a lid fixed relative to the agitator vessel, said lid having a flow inlet in fluid communication with said flow inlet region and a flow outlet in fluid communication with said flow outlet region;

sealing means disposed in a sealing region between said lid and said tank, said lid being mounted to said tank via said sealing means to allow relative rotational movement of said tank relative to said lid while maintaining said flow inlet in fluid communication with said flow inlet chamber and while maintaining said flow outlet in fluid communication with said flow outlet chamber to form an agitator head, said sealing means and said lid cooperating with said tank to form a sealed flow inlet chamber including said flow inlet region and said sealing means and said lid cooperating with said tank to form a sealed flow outlet chamber including said flow outlet region.

28. The agitator according to claim 27, wherein the cooling and/or heating medium includes one of iced water, ice slush, a glycol-water mixture and liquid nitrogen hot water or hot steam.

29. The agitator according to claim 1, wherein said agitating vane is connected to said agitator head via one or more of said cross-pieces, wherein said agitating vanes and said cross-pieces are double-walled defining said sections for flow of the cooling and/or heating medium.

* * * * *